United States Patent [19]

Nielsen

[11] Patent Number: 4,754,569
[45] Date of Patent: Jul. 5, 1988

[54] FISH RETRIEVING APPARATUS

[76] Inventor: Chris K. Nielsen, 15 Emery Street, Narragansett, R.I. 02882

[21] Appl. No.: 21,674

[22] Filed: Mar. 4, 1987

Related U.S. Application Data

[63] Continuation-in-part of Ser. No. 837,894, Mar. 10, 1986, abandoned.

[51] Int. Cl.⁴ .............................................. A01K 97/14
[52] U.S. Cl. .................................................. 43/5; 43/6
[58] Field of Search ................. 43/5, 6; 294/126, 127, 294/128, 129, 130, 66.1, 19.3; 124/22, 16, 26, 34

[56] References Cited

U.S. PATENT DOCUMENTS

| | | |
|---|---|---|
| 760,181 | 5/1904 | Buschemeyer ............................ 43/5 |
| 1,709,298 | 4/1929 | Zoppa ....................................... 43/5 |
| 2,233,670 | 3/1941 | Lee ........................................... 43/5 |
| 3,210,880 | 10/1965 | Greiner ..................................... 43/6 |
| 3,444,642 | 5/1969 | Mastropolo .............................. 43/6 |
| 3,694,952 | 10/1972 | Matthews ................................. 43/5 |

*Primary Examiner*—Kurt Rowan
*Attorney, Agent, or Firm*—Barlow & Barlow, Ltd.

[57] ABSTRACT

A fish retrieving apparatus includes a shaft with a dart removably affixed thereto and thrust generating devices are attached to the shaft. Guides permit the apparatus to slide down a fishing line where a trigger mechanism fires the dart impaling the fish.

3 Claims, 3 Drawing Sheets

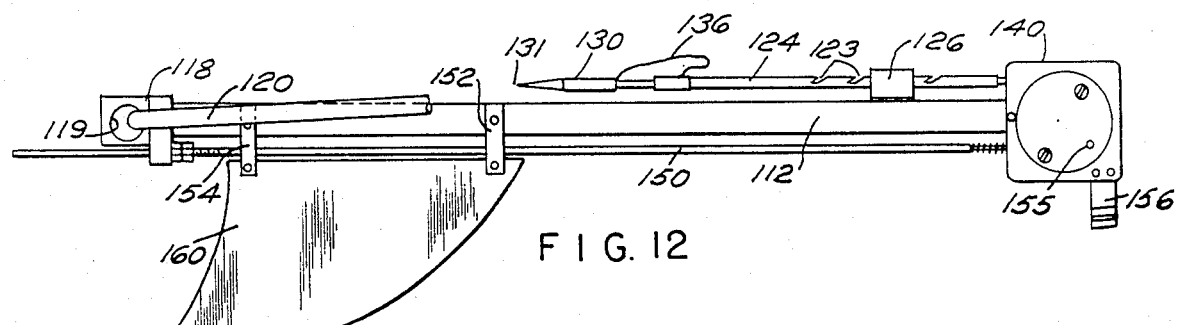
FIG. 12
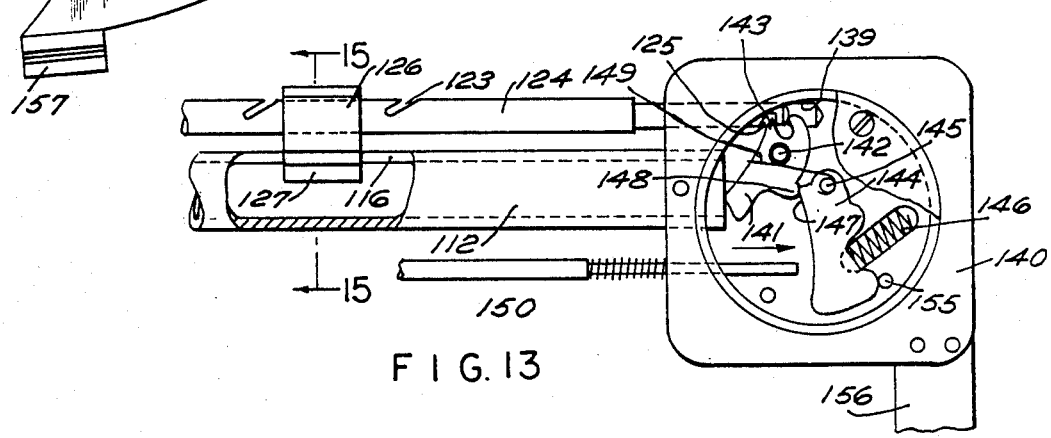
FIG. 13
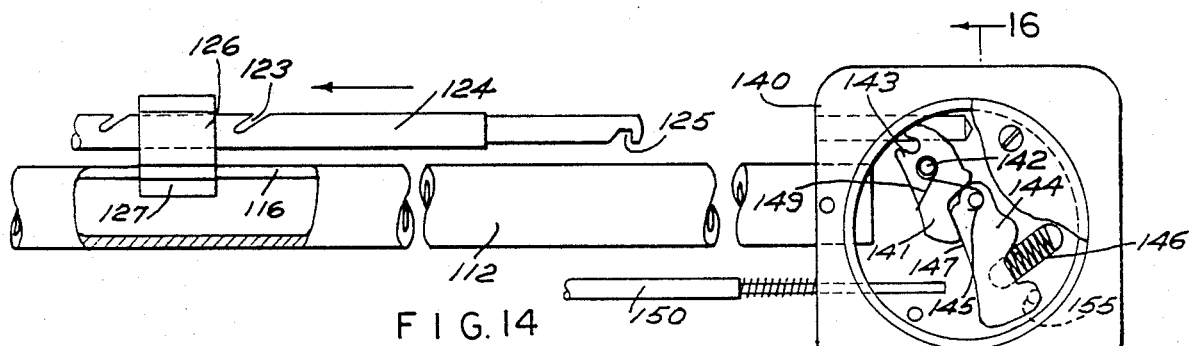
FIG. 14
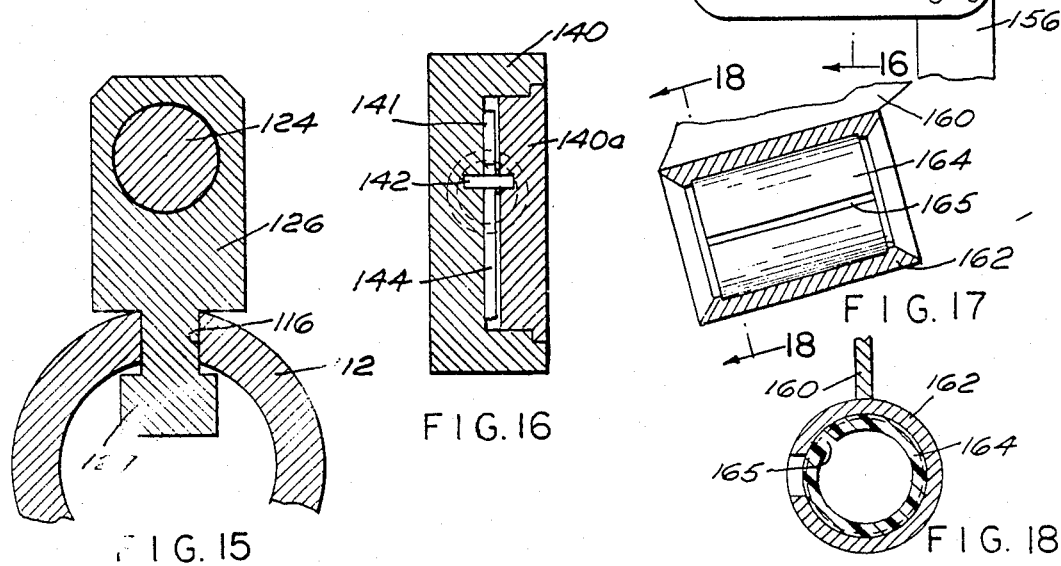
FIG. 15
FIG. 16
FIG. 17
FIG. 18

FISH RETRIEVING APPARATUS

CROSS REFERENCE TO RELATED APPLICATION

This application is a continuation in part of my application Ser. No. 837,894, filed Mar. 10, 1986, now abandoned.

BACKGROUND OF THE INVENTION

When reeling in a fish caught on a hook, in particular a large fish such as a blue bill or tuna, there is difficulty in bringing the fish to the surface and then along side the boat where it can be gaffed or grabbed by a grappling hook. This is due to the fact that after the main fight is over, the fish often lies somewhat exhausted twenty or more feet below the surface. If sharks are in the area the fish is prey to them in this condition and may be lost to the fisherman. It is therefore the principal object of my invention to provide a device to retrieve a large fish before it can be reeled in within the reach of a conventional gaffing hook. The only prior attempts at this general operation known to applicant are illustrated in the Holling U.S. Pat. No. 3,911,608, where a dip net is released down a fishing line to snare a fish or a grappling device is lowered down the fishing line as in Puckett U.S. Pat. No. 3,095,662 or Matthews U.S. Pat. No. 3,526,053. These prior art systems are entirely adequate for retrieving small fish but with the larger fish they are not useful.

SUMMARY OF THE INVENTION

The main object of the instant invention is to provide an improved apparatus for retrieving large fish. In achieving this result I have provided a tubular body that may be slidably mounted on a fishing line through guides and associated with the tubular body for relative longitudinal movement, is a shaft, and on the end of the shaft is received a detachable dart. The arrangement is such that the shaft is retained in the tubular body while the dart is fastened by a flexible means to the shaft. The shaft may be suitably propelled within the tubular body to drive the dart into the body of the fish. When the tubular body is dropped down the fishing line, a trigger device will release the shaft and drive the dart forward into the body of the fish. The dart becomes physically separated from the shaft yet tethered thereto, and a retrieving line fastened to the tubular body brings the apparatus and the fish to the surface.

DESCRIPTION OF THE DRAWINGS

FIG. 12 is a elevational view of a still further embodiment;

FIGS. 13 and 14 are enlarged broken views showing the latching means;

FIG. 15 is a sectional view taken on lines 15 on FIG. 1;

FIG. 16 is a sectional view taken on lines 16, 16 of FIG. 14;

FIG. 17 is an enlarged view showing the fishing line guide; and

FIG. 18 is a section taken on lines 18, 18 of FIG. 17.

BRIEF DESCRIPTION OF THE PREFERRED EMBODIMENT

Figure 1:
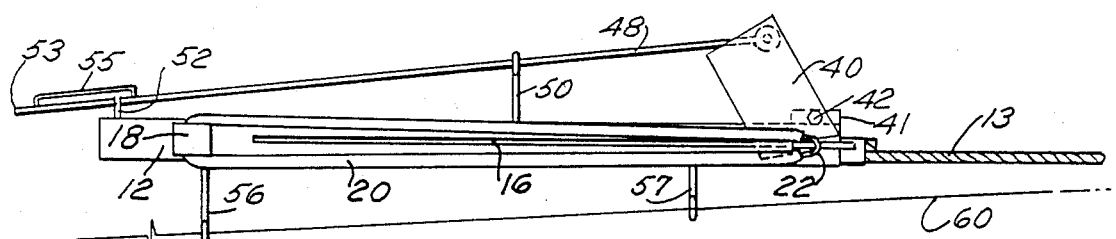
FIG. 1 is an elevational view of my fish retrieving apparatus made in accordance with the invention.

Referring now to the drawings, the device of my invention includes a tubular body 12 which is provided at one end with a suitable means for attaching a retrieving line 13, as for example a U shaped clip 14 that may be fastened to the tubular body. The body 12 is preferably formed with a longitudinal slot 16 that extends partway therethrough and has affixed to a forward or first end thereof an anchor 18 for a thrust generating means, such as loops 20 and 20', which may be rubber surgical tubing that may have fastened to the ends thereof U hooks 22, 22'.

Figure 2:
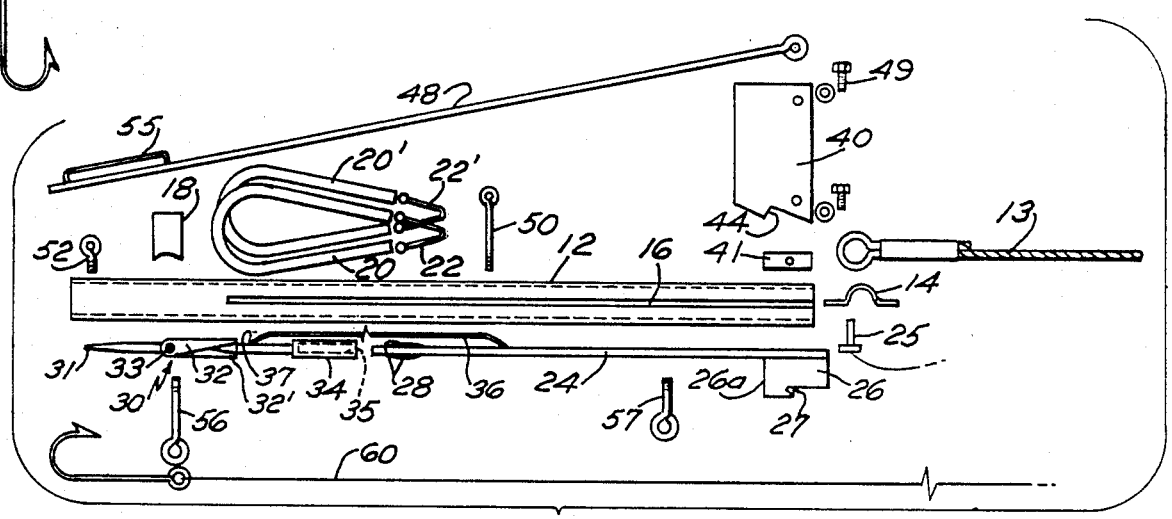
FIG. 2 is a detached view showing the various elements making up the apparatus of my invention.
Figure 3:
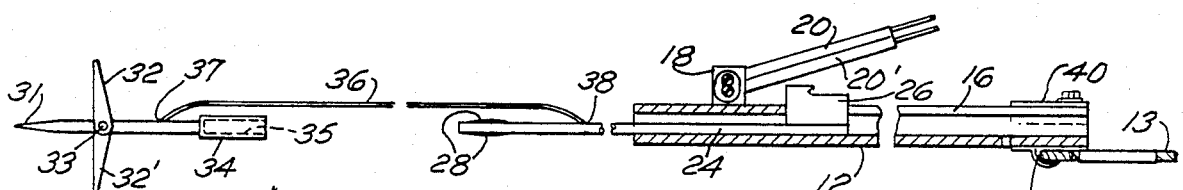
FIG. 3 is a broken elevational view, partly in section, showing the dart ejected from the tubular body.

A shaft 24 in the form of a slender steel rod is provided at one end thereof with a radially outward extending plate 26 which is notched as at 27, while the other end may be provided with spring fingers 28. The plate 26 extends through slot 16. A dart 30 has at its forward end a sharp piercing point 31 and inwardly of this point the dart is formed with a pair of gaffs 32, 32' that are pivotally mounted to the dart as at 33. The gaffs will normally assume a position as seen at FIG. 2 but at the moment of impact of the pointed end 31 with the body of a fish the force of impact as well as the sudden arresting of the forward motion of the dart will cause outward swinging movement of the gaffs 32 about their pivots, so that when the dart is retracted by a backward pull they will enter the body of the fish and be securely anchored therein. At the rear end of the dart there is an enlarged portion 34 having a bore 35 that will be received over the spring fingers 28 of the shaft 24, and to retain the parts together a securing wire or tether 36 is fastened in an aperture 37 in the dart and aperture 38 in the shaft 24.

The thrust generating means made up of the surgical tubing pieces 20 and 20' will have their U shaped hook portions 22, 22' engaged in the recess 27 of the shaft plate 26 as seen in FIG. 1. To retain the shaft in the cocked position, a trigger plate 40 is pivotally mounted as at 42 to a block 41. The plate is provided with a notch 44 and as seen in FIG. 1, the notch will engage the forward edge 26a of the plate 26. A trigger rod 48 is fastened to the plate 40 by fastener 49 and extends through a guide eye 50 and 52 so that its forward end 53 extends beyond the forward edge of the tubular body 12. A keeper bracket 55 insures that the rod 48 will not be withdrawn from its guide eye 52 and the plate 40 is made of a sufficient size so that it acts as a stabilizing fin to stabilize the motion of the apparatus as it moves through the water. To insure that the device is not prematurely released when armed, a tethered locking or safety pin 25 passes through the body 12 into shaft 24.

Figures 4, 5, 6:
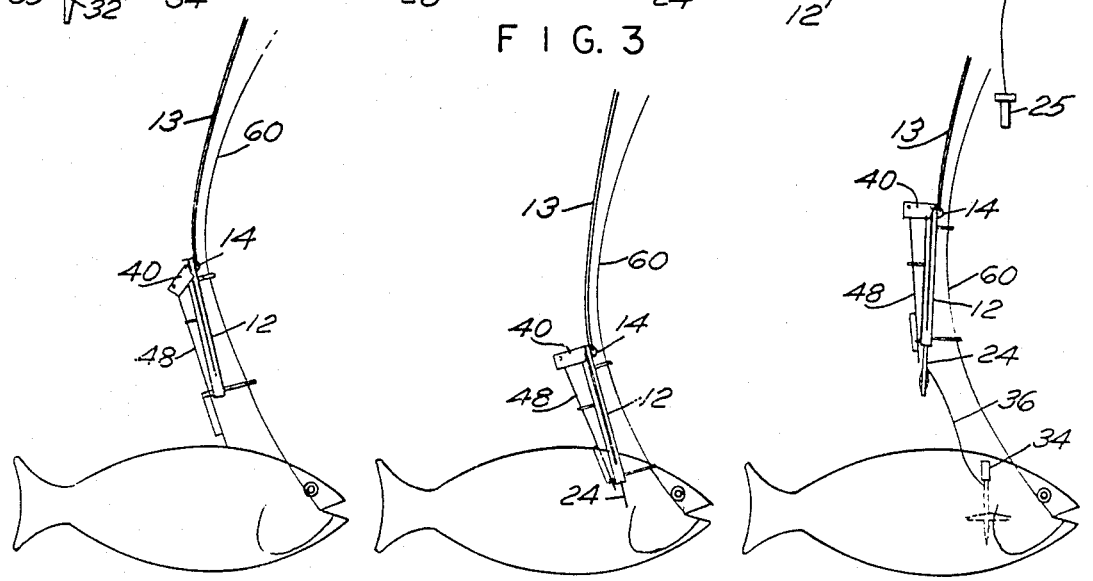
FIGS. 4, 5 and 6 are a series of diagrammatic views illustrating how the device of the invention operates to retrieve a fish.

To guide the tubular body to its target, a pair of guide eyes 56, 57 are mounted on the tubular body substantially opposite the plate 40 and it will be noted that these eyes extend different distances from the tubular body so that a proper angle of attack of the body to the fish will be achieved. Referring now to the FIG. 4, for an understanding of the operation, it must be assumed that the fish that has been hooked is exhausted and lying below the water in more or less of a static state. When this has occurred the retrieving device may be hooked onto a fishing line designated 60 by passing the fishing line through the slots in the eyes 56 and 57 and the device can be allowed to pass down the line. When the device is at the fish (FIG. 5), the end 53 of a trigger rod 48 will engage the fish releasing the shaft 24 and in turn the dart 30 which will now implant itself near the gills of the fish as seen in FIG. 6, at which time the retrieving line 13 may be pulled upwardly so that the fish may be brought to the surface and boated. The dart is tethered to the shaft 24 by the flexible means 36 that may be in the form of a stainless steel wire or the like, the shaft 24 remaining within the tubular body as the slot 16 retains the actuating plate 26.

Figure 7:
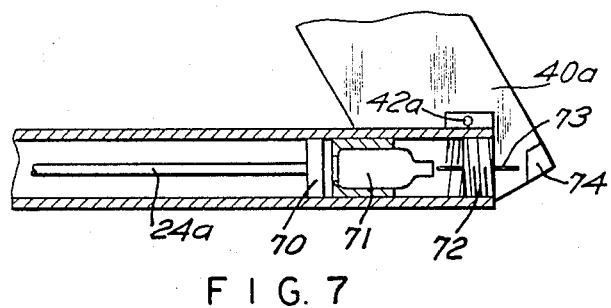
FIG. 7 is a partial sectional view of an alternate propelling arrangement for the apparatus.

There are other operating means available to expel the shaft 24 from the body. Referring now to FIG. 7, the shaft may be fitted with a piston 70 at its upper end and above the piston there is fitted a $CO_2$ bottle 71. An end cap 72 fitted on the tubular body has a piercing pin 73 passing therethrough, while the actuating plate 40 has an extension 74 that will engage the pin pressing the same into a frangible end of the $CO_2$ bottle, thus releasing gas and driving the shaft forward in the same fashion that the surgical tubing achieved the result. This arrangement somewhat simplifies the device and removes additional turbulence caused by the surgical tubing as the same passes through the water.

Figure 8:
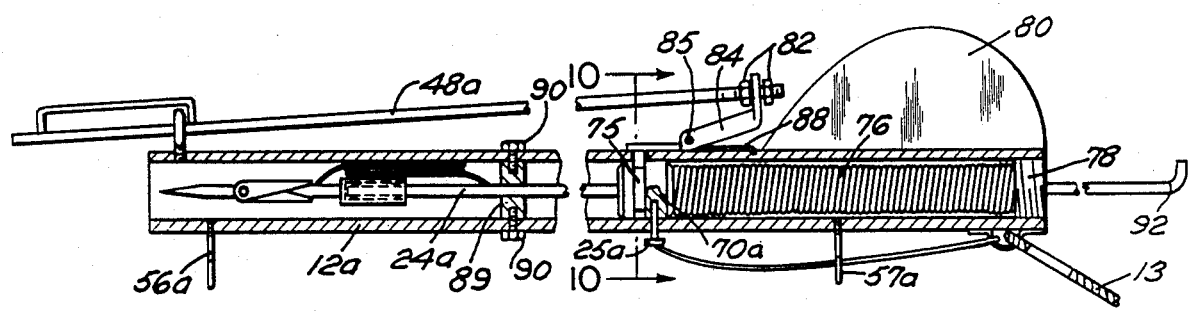
FIGS. 8 and 9 are broken elevational views, partly in section, showing a further modified form.
Figure 9:
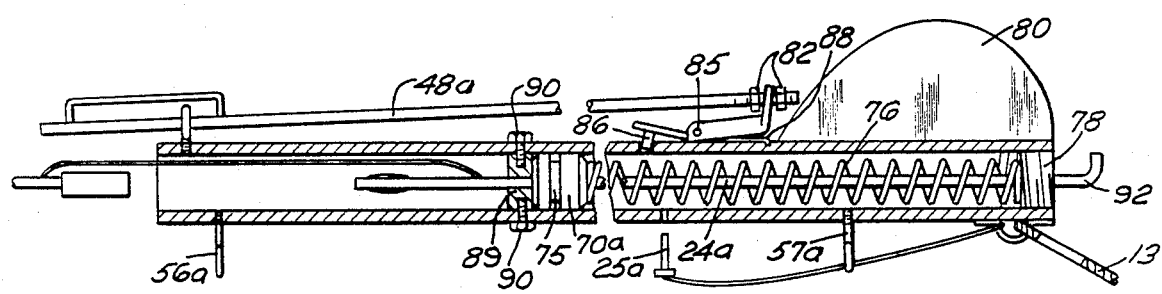
Figure 10:
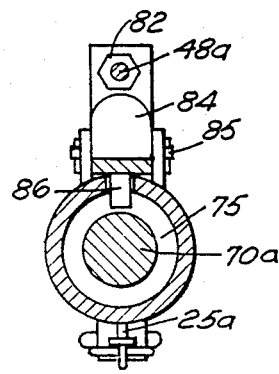
FIG. 10 is a sectional view taken on line 10—10 of FIG. 8.
Figure 11:
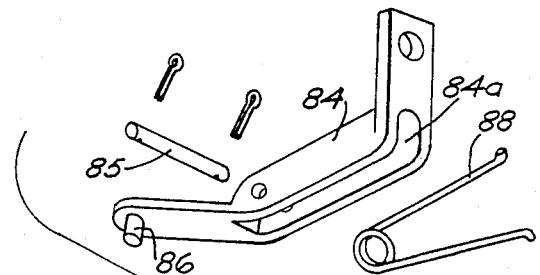
FIG. 11 is a detached view of the latch.

Referring now to FIGS. 8–11 a further embodiment is illustrated in which the tubular body 12a is fitted with a shaft 24a of the same basic construction save at its upper end where a guide piston 70 with a locking groove 75 is fitted. In the upper end of the tubular body 12a a stainless steel compression spring 76 presses against the upper end of the piston 70a and into one end while the other end presses against a threaded plug 78 in the upper end of the tubular body. Opposite the guide rings 56a, 57a is a stabilizing fin 80 and substantially in line with the stabilizing fin is a trigger rod 48a which is secured at its upper end as by a pair of threaded nuts 82 to a pivoting latch 84. A cocking rod 92 affixed to piston 70a, extends through plug 78 and allows the user to draw the piston and shaft to the armed position shown in FIG. 8. To hold the device armed, the latch as seen in FIGS. 10 and 11 is mounted on a pivot pin 85 and is provided at one end thereof with a latch pin 86 which drops down through an aperture in the tubular body and into the groove 75 in the piston end 70a. The latch 84 has a torsion spring 88 located in the groove 84a and received about the pivot pin 85 which will normally maintain the latch in the position as seen in FIG. 8. However when the fish is engaged, the rod 48a will move rearwardly of the body as seen in FIG. 9 releasing the pin 86 from the groove 75 and allowing the shaft 24a to propel itself forward and sink the dart into the body of the fish. To prevent excessive movement forward of the shaft 24a and to keep water out of the tubular body, a stop plug 89 held in place by fasteners 90 is provided partway down the tubular body which guides shaft 24a and provides a stop for the piston 70a. For additional security, to prevent any accidental release of the shaft 24a until the device is rigged on the fishing line, a locking pin 25a extends through the tubular body 12a and into the piston 70a as seen in FIG. 8, the locking pin being tethered to a suitable location on the body 24a as illustrated.

Referring now to FIG. 12, another embodiment of my invention is illustrated which includes a tubular portion 112 which will have formed therein a longitudinal slot 116 (see FIG. 15). At the forward end of the tubular body, there is located an anchor block 118 which has an aperture 119 therein thru which rubber surgical tubing 120 passes, which surgical tubing extends rearwardly to terminate in hooks such as the hooks 22, seen in FIG. 2 that may engage slots 123 in the shaft 124. The shaft 124 has a guide block 126 affixed thereto which guide block (seen more particularly in FIG. 15) extends thru the slot 116 in the tubular body 112 and it retained in the slot by an enlarged portion 127. Affixed to one end of the shaft 124 is a dart 130 which may be provided with a sharp point such as 131 and gaffs or other retaining means such as an arrow format, well known to those skilled in the art. The dart may, as in the previous embodiment, be slipped over the end of the shaft 124 and is tethered to the shaft by means of a line such as 136.

As has been previously noted, the shaft 124 has thrust generating means in the form of surgical tubing 120 that may be affixed thereto and, in order to hold the shaft in the position, there is provided a latching mechanism which is contained in a block 140. It will be noted by referring to FIG. 13, the end of the shaft 124 passes thru a bore in the block 140 and the end of the shaft 124 has a notch 125 which is engaged by a dog 141 that is pivotally mounted in the block 140 as at 142. The dog 141 has a finger as at 143 that engages the notch and the dog is prevented from rotating by a trigger dog 144 that is pivoted as at 145 and normally retained in position by a compression spring 146. The arrangement is such that the surface of the trigger as at 147 will engage a protrusion 148, being urged thereagainst by a spring 149, which prevents the dog 141 from rotating. A trigger rod 150 extends thru the body 140 and thru a pair of guide eyes 152, 154 as well as the forward anchor 118 so that the end of the trigger rod extends forwardly of the whole device. To insure that the device is not prematurely released when armed, a pin (not shown) may extend thru a bore 155 in the cover 140a of the block 140.

To guide the device to its target, a pair of guide eyes 156, 157 are mounted thereon, the guide eye 156 being affixed to the block 140 while the guide eye 157 is mounted on the outer extremity of a stabilizing plate 160 which in turn is fastened to the brackets 152, 154. In essence, it will be noted that the guide eyes which are shown in greater detail in FIGS. 17 and 18 are made from a tubular member 162 into which there is received a plastic split insert 164 which plastic insert is fitted into a formed recess within the outer body 162. Also, it should be noted that each of the guide eyes as chamfered at the entry and exit portions and the arrangement is such that the split portion as at 165 of the plastic tubing may be readily rotated out of position, if necessary to insure that the line, once inserted, will stay in position.

As in the previous embodiments, the assembly is guided to its target by its guide eyes which have the fishing lines snapped therein and, when the device has slid down the line and engaged the gill plate of the fish, the trigger rod 150 will strike the trigger 144 driving the shaft 124 to the left as viewed in the drawing with sufficient force to implant the guard 130 into the gill plate of the fish. The dart will still be attached to the shaft by the tether line 36 and a retrieving line which is not illustrated but which would be attached to the body 140, for example, may pull the entire apparatus to the surface so that the fish may be boated.

I claim:

1. A fish retrieving apparatus comprising a tubular body having a forward end, a shaft operatively associated with said body whereby the shaft may move toward the forward end of the body, a separate dart received on a first end of the shaft, flexible means connecting the shaft and the dart, means for providing longitudinal thrust to said shaft operatively connected to the shaft, a pair of guide means mounted in spaced relation on the body, said guide means extending laterally from the body and adapted to receive a fishing line that is outside the body the arrangement being such that the body is spaced away from the line, a retrieving line affixed to the body and trigger means on said body at the first end thereof containing the dart whereby when a fish is struck by the trigger, the shaft and dart will be propelled engaging the fish.

2. A fish retrieving apparatus as in claim 1 wherein a stabilizing fin is mounted on the body to maintain directional control as the apparatus is guided down the fishing line by the guide means.

3. A fish retrieving apparatus comprising a tubular body having a forward end, a shaft operatively associated with said body whereby the shaft may move toward the forward end of the body, a separate dart received on a first end of the shaft, flexible means connecting the shaft and the dart, means for providing longitudinal thrust to said shaft operatively connected to the shaft, a pair of guide means mounted in spaced relation on the body, said guide means extending laterally from the body and adapted to receive a fishing line that is outside the body, a retrieving line affixed to the body and trigger means on said body at the first end thereof containing the dart, said trigger means includes a rod slidably mounted on the body, said rod extending outwardly of the forward end of the body whereby when a fish is struck by the trigger, the shaft and dart will be propelled engaging the fish.

* * * * *